M. J. REXICKER.
MUZZLE FOR DOGS, &c.
APPLICATION FILED NOV. 5, 1908.

953,437.

Patented Mar. 29, 1910.

Witnesses:—
Gustav W. Hora.
Richard Sommer.

Inventor
Martin J. Rexicker
by Geyer & Popp
Attorneys.

ANDREW B. GRAHAM CO., PHOTO-LITHOGRAPHERS, WASHINGTON, D. C.

UNITED STATES PATENT OFFICE.

MARTIN J. REXICKER, OF NORTH TONAWANDA, NEW YORK, ASSIGNOR OF ONE-HALF TO ALTON G. ENSIGN, OF TONAWANDA, NEW YORK.

MUZZLE FOR DOGS, &c.

953,437.  Specification of Letters Patent.  Patented Mar. 29, 1910.

Application filed November 5, 1908. Serial No. 461,112.

*To all whom it may concern:*

Be it known that I, MARTIN J. REXICKER, a citizen of the United States, residing at North Tonawanda, in the county of Niagara and State of New York, have invented a new and useful Improvement in Muzzles for Dogs, &c., of which the following is a specification.

This invention relates to a muzzle which is more particularly intended for use on dogs but which may also be used on other animals.

The object of this invention is to produce a muzzle for this purpose which is very simple and inexpensive in construction, which does not cover the head of a dog unduly, and which will effectually prevent a dog from injuring any one by biting but permits the dog to open his mouth sufficiently for breathing, drinking and eating.

Figure 1:
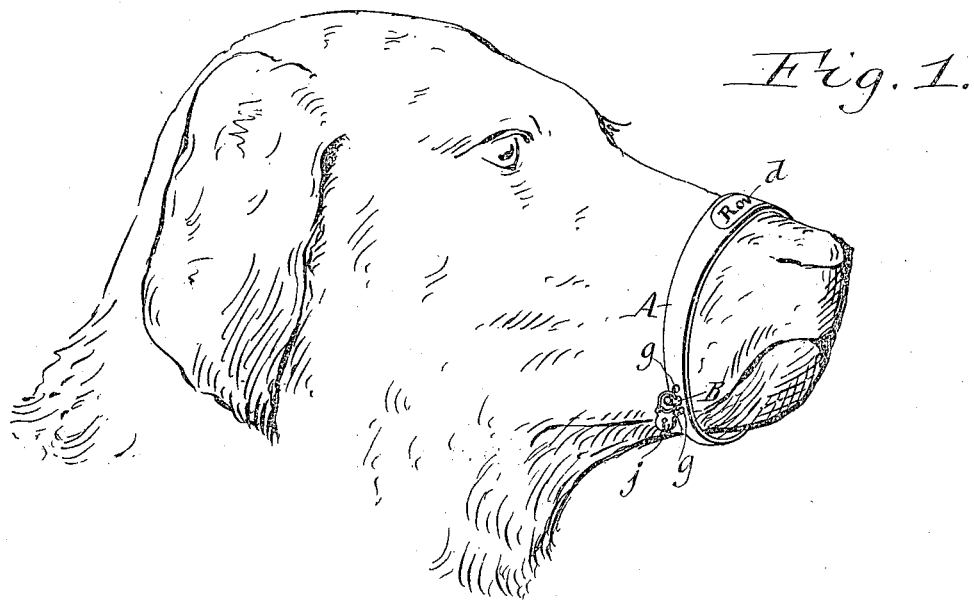
Figure 2:
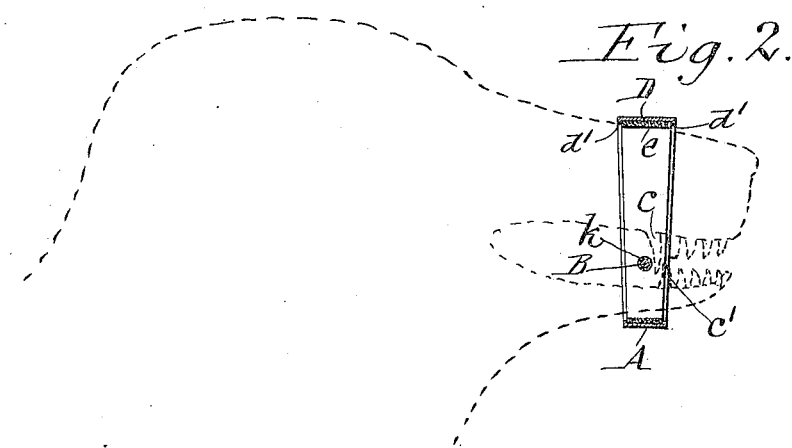
Figure 3:
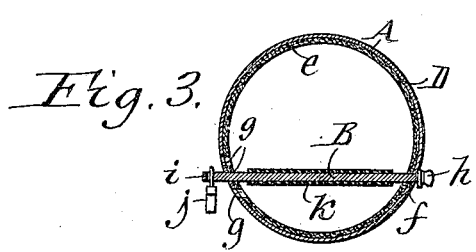
Figure 4:
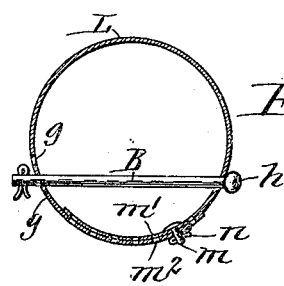

In the accompanying drawings: Figure 1 is a perspective view showing my improved muzzle applied to the jaws of a dog. Fig. 2 is a fragmentary longitudinal section of the muzzle and the jaws of a dog in dotted lines to illustrate the relation of the muzzle to the tusks of the dog. Fig. 3 is a cross section of the same. Fig. 4 is a cross section showing a modified construction of the muzzle.

Similar letters of reference indicate corresponding parts throughout the several views.

Referring to the construction shown in Figs. 1, 2 and 3, A represents a rigid ring or annular band or circular body, and B a rigid or non-jointed cross bar or bit mounted at its opposite ends on opposite sides of the ring. The ring is placed around the outer sides of the upper and lower jaws of a dog or other animal and the cross bar or bit is placed transversely between the jaws and behind the upper and lower tusks $c$, $c^1$ of the jaws. It is well known that the tusks of a dog or similar animal are longer than the remaining teeth. The size of the ring is determined by the size of the jaws of a dog, a ring of the proper size being applied to each particular dog as will enable him to open his mouth only sufficient for breathing, drinking and ordinary eating but not sufficient to permit him to bite viciously. The bit is arranged at such a distance from the top and bottom of the body ring that the bit is confined behind the tusks and cannot escape forwardly therefrom, thereby preventing the muzzle from becoming detached from the jaws of the dog. The ring is preferably wider at the top than at the bottom so as to provide ample space for applying an inscription $d$ of the name of the dog or its owner or other information. On the inner side or bore of the ring the same is preferably provided at opposite edges with inwardly projecting annular flanges or rims $d^1$ forming a channel or groove D in which is seated a ring shaped cushion lining $e$ of felt or similar soft material so as to prevent the ring-shaped body of the muzzle from chafing the face of the dog.

In order to permit of readily attaching the muzzle to or removing the same from the dog, the bit is detachably connected with the body ring. This is preferably effected by seating the bit at its opposite ends in openings $f$, $g$ on opposite sides of the body ring and providing one end of the same with a head $h$ which engages the adjacent outer side of the body ring while its other end is provided with an opening $i$ for the reception of a lock $j$, as shown in Fig. 2, or other suitable fastening for engaging the adjacent outer side of the body-ring.

Means are provided for adjusting the position of the bit relative to the top or bottom of the body-ring to suit the height of either the upper or the lower jaw and properly engage the bit with the tusks of the respective jaw. The preferred means for this purpose shown in the drawings consist in providing one side of the body-ring with a set or plurality of openings $g$ which are arranged in a circumferential row. By engaging the respective end of the bit with one or the other of the series of openings $g$, the position of the bit relatively to the top or bottom of the body ring may be varied as may be necessary to fit the muzzle to the jaws of a particular dog.

For the purpose of engagement of the mouth of the dog with the bit when the same is made of metal, the latter is covered between its ends with a cushion covering, shell or sleeve $k$ of hard rubber or similar yielding material.

In order to avoid making a large variety of sizes of body-rings to suit different dogs, the body of the muzzle may be constructed in the form of a split ring or band L, as shown in Fig. 4. In this construction the ends of the body are lapped one over the other more or less for obtaining the required size to suit a particular dog and after adjustment the body may be held in this position by means of a bolt or pin $m$ passing through corresponding openings $m^1$, $m^2$ formed in longitudinal rows in the ends of the body and confined against displacement by a spring pin or key $n$ or other suitable means.

My improved muzzle is very neat in appearance, it does not irritate the dog and is efficient in preventing a dog from biting in the usual manner without however interfering with his ability to drink and eat.

I claim as my invention:

1. A muzzle comprising a continuous rigid circular body adapted to be placed around the jaws of a dog or similar animal, and a continuous or non-jointed bit extending diametrically across said body and connected at its opposite ends with the same and adapted to be arranged transversely between said jaws and engage with the rear side of the tusks thereof.

2. A muzzle comprising a continuous rigid circular body adapted to be placed around the jaws of a dog or similar animal, and a non-jointed bit adapted to be arranged transversely between said jaws and to engage with the rear sides of the tusks thereof and extending diametrically across said body, and means for connecting the bit with said body and constructed to permit said bit to be adjusted vertically on the body.

3. A muzzle comprising a continuous rigid annular body provided on opposite sides with openings, and a bit consisting of a bolt or rod arranged in said openings and provided at one end with a head adapted to bear against the adjacent outer side of the body, and a fastening applied to the other end of the rod and adapted to engage with the opposite outer side of the body.

4. A muzzle comprising an annular body provided on one side with a single opening and on its opposite side with a set of openings arranged in a circumferential row, and a bit extending through said single opening and one of said sets of openings.

5. A muzzle comprising an annular body provided on one side with a single opening and on its opposite side with a set of openings arranged in a circumferential row, a bit extending through said single opening and one of said sets of openings, and means for holding said bit in one or the other of said sets of openings.

Witness my hand this 30th day of October, 1908.

MARTIN J. REXICKER.

Witnesses:
E. M. GRAHAM,
ANNA HEIGIS.